United States Patent [19]

Metzler et al.

[11] 4,164,826
[45] Aug. 21, 1979

[54] SALMON JIG

[76] Inventors: Phares H. Metzler, 11200 - 15th SW., Seattle, Wash. 98146; Norman P. Metzler, 501 E. 10th St., Port Angeles, Wash. 98362

[21] Appl. No.: 919,410

[22] Filed: Jun. 26, 1978

[51] Int. Cl.² .................................................. A01K 85/00
[52] U.S. Cl. .................................. 43/42.05; 43/42.39; 43/42.48
[58] Field of Search ................. 43/42.05, 42.36, 42.39, 43/42.45, 42.4, 42.5

[56] References Cited
U.S. PATENT DOCUMENTS

| | | | |
|---|---|---|---|
| 1,390,458 | 9/1921 | Moree | 43/42.05 |
| 2,236,353 | 3/1941 | Minser | 43/42.48 X |
| 3,148,475 | 9/1964 | Goodall | 43/42.48 |
| 3,264,775 | 8/1966 | Nahigian | 43/42.39 |
| 3,676,948 | 7/1972 | Hill | 43/42.45 |
| 3,981,096 | 9/1976 | Toivonen | 43/42.39 |

Primary Examiner—Nicholas P. Godici
Attorney, Agent, or Firm—Christensen, O'Connor, Johnson & Kindness

[57] ABSTRACT

A salmon jig is disclosed on the slip-hook principle with a shape and related line connection arrangement imparting a unique action not attained by other jigs. It comprises an elongated plate-like lead body tapered in width from its leading end to its trailing end, having substantially a 20° bend transverse to its body plane at a location about one-third of its length forwardly of its trailing end, and having an oblique, substantially flat leading end face angled at approximately 45° to its body plane and 45° to a longitudinal plane perpendicular to its body plane, with a longitudinal line element slide bore extending from an exit at the trailing end to an entrance at the leading end, the latter being spaced transversely inwardly in the body plane from the longer longitudinal edge of the body by approximately one-third the body's maximum width.

6 Claims, 8 Drawing Figures

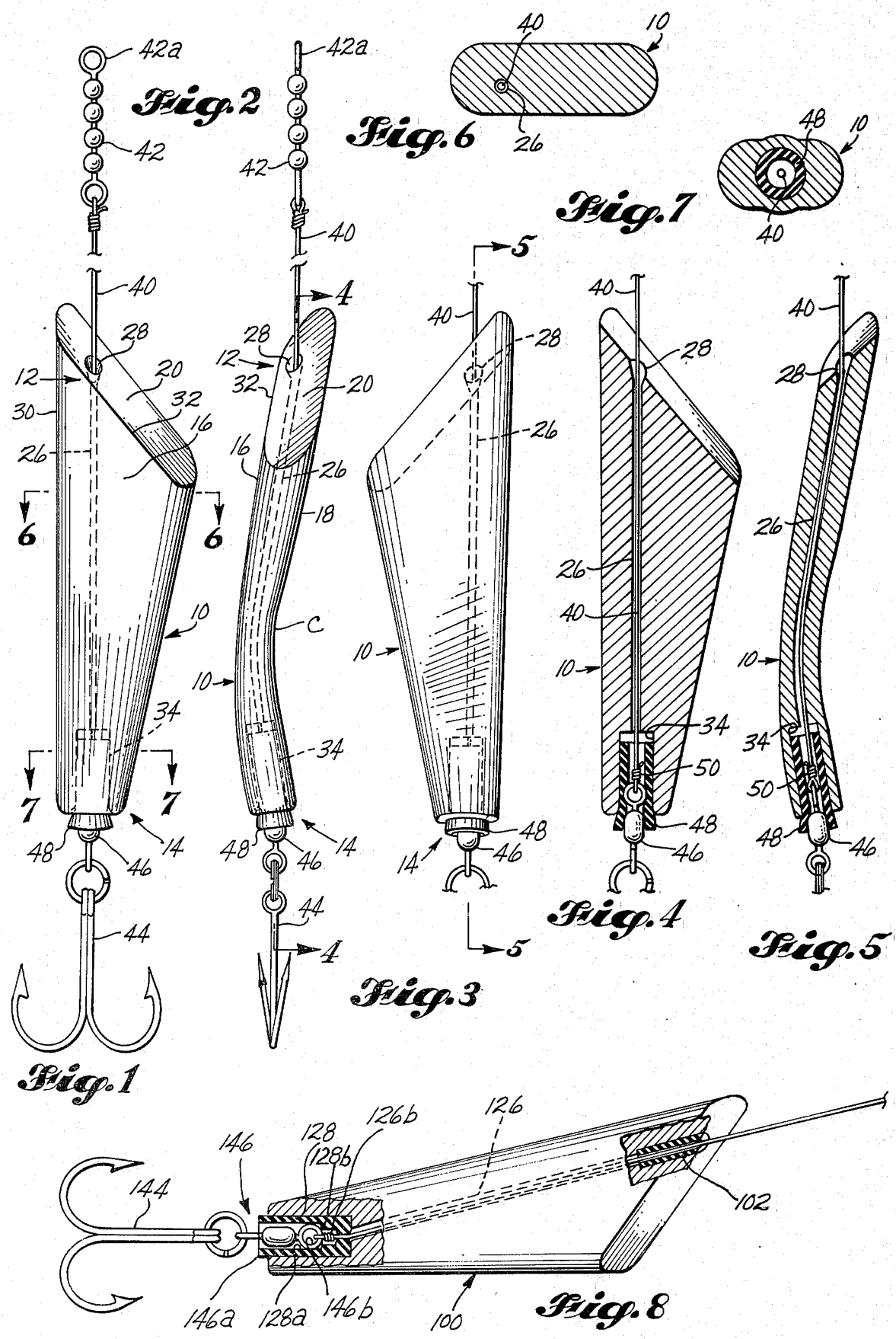

SALMON JIG

BACKGROUND OF THE INVENTION

This invention relates to fishing jigs and more particularly to a novel jig particularly suited for catching salmon of the species referred to as Blackmouth which are feeder Chinooks or Kings. These highly prized fish feed at the bottom of deep sounds and estuaries in Pacific Northwest waters during the late fall, winter and early spring months of the year and due to tidal currents and scrap fish above them are difficult to reach and attract with ordinary lures and bait at those depths. The invention is herein illustratively described by reference to its presently preferred embodiments; however, it will be recognized that certain minor modifications and changes therein with respect to details may be made without departing from the essential features involved.

The difficulties of attracting and catching Blackmouth salmon in Pacific Northwest waters, particularly during the late fall, winter and spring months when the fish are not schooling with those making their spawning runs, have inspired many and varied efforts at designing artificial lures. Lures that can be trolled deep bring success to the careful fisherman working the vessel and special gear to maintain near-bottom depth during a troll. However, use of fresh herring and candlefish "mooched" with the vessel stopped and the weighted line lowered to the bottom is still a popular technique since it affords a reliable means to keep the bait at or near the bottom when sophisticated electronic sounders and special trolling gear are not available. The difficulty with using a sinker and fresh bait to mooch for salmon, however, still lies in reaching the bottom readily in heavy tidal currents and in the problem of dogfish and other scrap fish taking the bait before it is taken by a salmon. The broad object of this invention is to devise an artificial lead (Pb) jig that has the necessary density and weight to reach bottom readily and the required special action to attract salmon.

In fishing with herring, it is common practice to "plug-cut" the bait by severing the head from the body by an oblique cut that provides a leading face angled approximately 45° to the body plane and approximately 45° to a longitudinal plane at right angles to the body plane of the herring. The leading hook of a double (spaced) hook leader connection is then passed through the oblique face at the forward end of the body at a location near the severed end of the backbone and allowed to protrude through the side of the body while the trailing hook is allowed to trail freely, or is embedded in the body near the tail. With the plug-cut herring thus attached to the leader and a suitable size sinker with swivels connecting the leader to the fishing line, the bait can be either mooched or trolled behind the vessel. In such mooching there are not only the problems mentioned above but valuable time is often wasted with bait and sinker tangled together unknown to the fisherman.

With this novel salmon jig, such tangling problems are avoided; moreover, it has been found that a specially shaped and rigged lead metal jig, suggestive of a herring, is just as effective in catching salmon as the real bait. Cod jigs and the like heretofore fished in like manner have been used in catching salmon but with limited success. Despite its great density and weight, however, that might be thought to preclude an attractive lure action, the novel lead jig form of this invention does produce the required action and proves to be successful.

BRIEF DESCRIPTION OF THE INVENTION

As herein disclosed the salmon jig comprises an elongated plate-like lead body with rounded side edges and a doubly angled leading end face, angled at 45° to the general body plane and also at 45° to a longitudinal plane perpendicular to such body plane. The jig body is bent through a small acute angle near the tail and tapers in width from its head end to its trailing end. Its head end width is a few times its trailing end width and is approximately twice the body thickness, which is preferably about the same from head to tail. A longitudinal through-bore that slidably passes a line element has an entrance in the oblique leading end face adjacent the side of that face nearest the tail and spaced inwardly from the longer longitudinal edge of the body about one-fourth to one-third the body width of the head end.

Anti-chafing line protector plastic insert grommets or guide tubes lodged in the entrance and exit ends of the line element bore in the body may be provided if desired, with that embedded in the tail end exit serving as a releasing retainer and protector for hook means trailing at that location. An alternative releasable retainer and protector may be provided by an elastic tubular sleeve surrounding a hook swivel and line knot secured thereto.

These and other variations of the disclosed jig embodiment will be recognized by those skilled in the art having reference to the present disclosure.

BRIEF DESCRIPTION OF THE DRAWINGS

FIG. 1 is a side view of the improved salmon jig.

FIG. 2 is an edge view of the improved jig.

FIG. 3 is a side view opposite that of FIG. 1.

FIG. 4 is a longitudinal sectional view taken on line 4—4 in FIG. 2.

FIG. 5 is a longitudinal sectional view taken on line 5—5 in FIG. 3.

FIG. 6 is a transverse sectional view taken on line 6—6 in FIG. 1.

FIG. 7 is a transverse sectional veiw taken on line 7—7 in FIG. 1; and,

FIG. 8 is a side view of a modification, shown partly in section to reveal head end and tail end plastic insert line protection and hook means release grommet tubes in the jig.

DETAILED DESCRIPTION WITH REFERENCE TO DRAWINGS

With reference to FIGS. 1-6, it will be seen that the lead or other heavy metal sinker body 10, suitably plated or painted to reflect light, is of substantially plate-like elongated form tapering in width from its head end 12 to its tail end 14 such that the tail end width is approximately one-half the head end width. The head end width is preferably a few times, such as four times, the body thickness. Opposite longitudinal edges of the body are convexly rounded throughout the length on substantially circular arcs, whereas between those edges the side faces of the body 16 and 18, respectively, are substantially flat and parallel to each other. With the exceptions indicated below, the thickness of the body throughout its length is substantially uniform in the preferred form of the lure, although some variations in thickness and surface shape on opposite faces is permissible.

At its head end the body terminates in an oblique leading end face 20 that is angled at approximately 45° to the general body plane and also at approximately 45° to a longitudinal plane perpendicular to such body plane. This doubly angled oblique transverse face, together with the other elements of design being described are important factors in producing the desired wobbling rotational action of the jig when drawn through the water by the attached fishing line.

Another such factor critical to effective lure action is the body curvature. At a location approxiamtely one-third the length of the body forwardly from the tail end, the body is bent or curved out of its general body plane forwardly thereof through an arc of approximately 20°. This curvature occurs in an arc of a length about equal to the width of the lure body at the center of the arc. At the curvature the body is preferably slightly thinner than it is forwardly and rearwardly. By "slightly thinner" is meant from about 10% to 20% thinner.

Still another factor important to action of the jig is the line departure location at the head end. A longitudinal line slide bore 25 extends from the head end to the tail end of the body. At the head end of the body the line-receiving slide bore entrance port 28 is located in the oblique leading end face 20. At its trailing end the slide bore 26 ports centrally through the tail end of the body, where the body has a counterbore 34 for a purpose to be described. The location of the leading end port 28 is established approximately one-fourth to one-third the distance from the longer longitudinal edge 30 of the body toward the opposite edge and preferably also at a location closely adjacent to the lagging transverse edge 32 formed by the oblique face 20 intersecting the adjacent side face. At the tail end the body is slightly thickened in the central region to provide a region of metal within which the counterbore 34 is formed. By "slightly" is meant from 10% to 20%.

In rigging the improved jig for action and as a part of the assembly, a line element 40, such as a length of nylon fishing line, is passed slidably through the longitudinal bore 26 and usually at its forward end is connected by a swivel connector 42 having an eye 42a for attachment of a fishing line. At its trailing end, the line element 40 is secured to a hook means 44, usually through a barrel swivel connector 46. In this lure the swivel connector 46 is enclosed in a soft rubber sleeve 48 that protects the fastening of the line element 40 thereto at 50. The sleeve connection is then pressed forwardly into the counterbore 34 where it is held releasably by friction. However, the frictional retention of the rubber sleeved swivel element 46 in the counterbore is so designed that the striking of a fish caught by the hooks 44 reacting against the large inertia of the body 10 is sufficient to dislodge the hooks and thus permit the body to slide freely on the line element 40. In this way, the violent jerking and tugging of the fish on the hooks is not permitted to react against the body weight and thereby dislodge the hooks from the fish's mouth. The technique of a sliding connection in a lure or in a sinker is in itself not new, however.

In the modification shown in FIG. 8, the jig body 100 is or may be substantially the same as in the preceding embodiment. In this instance a line protecting plain plastic tube insert 102 of polyethelene or similar material is embedded in a counterbore formed in the entrance port of line receiving bore 126. Likewise, a tubular plastic insert 128 of molded form and of similar plastic material is embedded in the tail end of the lure body, in a counterbore formed in the exit port of the bore 126. The interior of this tail insert opens rearwardly through a relatively large cylindrical chamber 128a, larger in diameter than the barrel 146a of swivel connector 146 and slightly smaller in diameter than the forward line fastener ring 146b of the connector. Hence the latter must be pressed forwardly against friction to its seat in the chamber 128a abutted against the reduction shoulder 128b where the interior of insert 128 drops to a diameter that is slightly smaller yet sufficient to accommodate the line knot 126b. At its forward extremity the interior diameter of insert 128 becomes slightly smaller than that of bore 126. The forward interior rims of both fittings 102 and 128 are smoothly rounded, and being of relatively soft plastic material protect the line against abrasion and wear.

As in the preceding embodiment, releasable frictional retention of the hook means in the trailing end of the lure body coupled with free sliding of the line in the body provides the desired slip effect to prevent the catch once hooked from unhooking itself readily by violent jerking aginst the reactive inertia of the heavy lure body. The barrel 146a of the swivel connector 146 is free to rotate in the chamber 128a and thereby permit the trailing hooks 144 to rotate and swing freely, thereby to impose the least degree of resistance to free wobbling action of the jig when drawn forwardly through the water.

With these and other aspects of the invention recognized from the disclosure of its preferred form, it will be apparent that certain minor changes in design may be made without departing from the essential features.

The embodiments of the invention in which an exclusive property or privilege is claimed are defined as follows:

1. A fishing jig comprising an elongated plate-like heavy-metal body of generally uniform body thickness and tapered in width from head end to tail end, with longitudinal edges convexly rounded, with head end width at least approximately twice tail end width and at least approximately a few times body thickness, with said body terminating at its head end in a transverse substantially flat head end face angled obliquely at approximately 45° both to the general body plane and to a longitudinal plane perpendicular to said body plane, a longitudinal line-receiving open bore in said body extending from a port in the tail end to an opposite port in the head end, the latter port being located transversely inwardly from the longer longitudinal edge of the body by approximately one-fourth to one-third the width of the body at the head end and at a position relatively closely adjacent to the intersection of the head end face and the side of the body adjacent the lagging edge of said head end face, said body having an arcuate bend therein of approximately 20° transverse to the body plane, said bend occurring at a location approximately one-third of the length of the body forwardly of its tail end.

2. The fishing jig defined in claim 1 wherein the head end port of the bore is located in the head end face and has a tubular plastic insert therein to protect the fishing line against chafing and wear.

3. The fishing jig defined in claims 1 or 2 wherein the tail end port of the bore has a tubular plastic insert therein adapted to frictionally hold a hook fastener means releasably therein.

4. The fishing jig defined in claims 1 or 2 wherein the tail end port of the bore has a tubular plastic insert therein adapted to frictionally hold a hook fastener means releasably therein, said latter insert having an interior including a rearwardly open cylindrical chamber adjoined by a chamber of reduced diameter large enough to accommodate a line knot tied to a hook fastener swivel ring, and terminating forwardly in a bore smoothly rounded at its rim and slightly smaller than said line-receiving bore in the body.

5. The fishing jig defined in claim 1 and further including a line element slidably received in the longitudinal bore and having hook means fastened to the end thereof beyond the tail, and a soft rubber sleeve surrounding and frictionally gripping the fastening of the line element and the hook means and removably retained by friction in said counterbore.

6. The fishing jig defined in claim 1 wherein the longitudinal edges of the body are convexly rounded in a substantially circular arc from head end to tail end of the body and wherein the side faces of the body are substantially flat and parallel between said longitudinal edges, with the arcuately bent portion of the body being of slightly reduced thickness and the tail extremity portion at least centrally being of slightly increased thickness.

* * * * *